United States Patent
Kasahara et al.

(10) Patent No.: US 7,560,157 B2
(45) Date of Patent: Jul. 14, 2009

(54) ADHESIVE COMPOSITION AND GLASS PLATE WITH THERMOPLASTIC ELASTOMER MOLDING

(75) Inventors: Takayuki Kasahara, Aichi (JP); Yuji Masaki, Aichi (JP); Yasuhiro Shibuya, Aichi (JP); Takafumi Masuda, Hyogo (JP); Tatsuo Tsuneka, Hyogo (JP); Shoji Maekawa, Hyogo (JP)

(73) Assignees: Asahi Glass Company, Limited, Tokyo (JP); Toyo Kasei Kogyo Co., Ltd., Osaka (JP)

( * ) Notice: Subject to any disclaimer, the term of this patent is extended or adjusted under 35 U.S.C. 154(b) by 532 days.

(21) Appl. No.: 11/066,475

(22) Filed: Feb. 28, 2005

(65) Prior Publication Data
US 2005/0191498 A1 Sep. 1, 2005

Related U.S. Application Data

(63) Continuation of application No. PCT/JP03/11084, filed on Aug. 29, 2003.

(30) Foreign Application Priority Data
Aug. 30, 2002 (JP) ............................. 2002-255226

(51) Int. Cl.
*B32B 7/02* (2006.01)
*B32B 7/12* (2006.01)
*B32B 17/06* (2006.01)

(52) U.S. Cl. .................. 428/212; 428/320.2; 428/332; 428/355 R; 428/355 EP; 428/429

(58) Field of Classification Search ................ 428/415, 428/47, 429, 81, 520, 519, 212, 320.2, 332, 428/355 R, 355 EP; 525/70
See application file for complete search history.

(56) References Cited

U.S. PATENT DOCUMENTS

| 4,822,835 | A | * | 4/1989 | Close ........................ 524/114 |
| 5,023,288 | A | * | 6/1991 | Hirai et al. .................. 524/268 |
| 5,216,053 | A | * | 6/1993 | Jones et al. .................. 524/114 |
| 5,274,623 | A | * | 12/1993 | Usami et al. ............. 369/275.1 |
| 5,378,746 | A |   | 1/1995 | Beyrle et al. |
| 5,897,937 | A | * | 4/1999 | Cornils et al. ............... 156/242 |
| 6,846,894 | B2 | * | 1/2005 | Terada et al. .................. 528/28 |
| 6,894,115 | B2 | * | 5/2005 | Botros ........................ 525/101 |

FOREIGN PATENT DOCUMENTS

| CN | 1215383 A | 4/1999 |
| EP | 191649 | 8/1986 |
| EP | 398577 | 11/1990 |
| EP | 733689 | 9/1996 |

(Continued)

*Primary Examiner*—Jennifer McNeil
*Assistant Examiner*—Lawrence D Ferguson
(74) *Attorney, Agent, or Firm*—Oblon, Spivak, McClelland, Maier & Neustsdt, P.C.

(57) ABSTRACT

The adhesive composition of the present invention to be used for bonding a thermoplastic elastomer and a glass article, comprising a chlorinated polyolefin, an epoxy group-containing compound and a silane coupling agent, is excellent in initial adhesive properties and is also excellent in durability, and exhibits sufficient adhesive strength for bonding a thermoplastic elastomer molding and a window glass. Further, a glass plate with a thermoplastic elastomer molding, made by using the adhesive composition, is provided.

3 Claims, 3 Drawing Sheets

FOREIGN PATENT DOCUMENTS

| | | |
|---|---|---|
| JP | 54-158499 | 12/1979 |
| JP | 2-151634 | 6/1990 |
| JP | 6-329925 | 11/1994 |
| JP | 08-176375 * | 9/1996 |
| JP | 3142985 | 12/2000 |
| JP | 2003-55638 | 2/2003 |

* cited by examiner

ADHESIVE COMPOSITION AND GLASS PLATE WITH THERMOPLASTIC ELASTOMER MOLDING

TECHNICAL FIELD

The present invention relates to an adhesive composition excellent in adhesive properties between a thermoplastic elastomer and a glass article, and a glass plate with a thermoplastic elastomer molding using the adhesive composition.

BACKGROUND ART

With a glass plate for a window of an automobile, a member made of a resin or rubber, which is interposed between the glass plate and a body, which seals the space between the glass plate and the body, and which also has a decorative function as the case requires, is integrated. A member having such functions has various names such as a molding, a frame, a gasket or a mold, however, in the present specification, it is consistently referred to as a molding.

Heretofore, as a material for a molding, polyvinyl chloride has been heavily used, which is excellent in abrasion resistance and moldability.

However, in recent years, in view of environmental protection, it has been proposed to use a thermoplastic elastomer as represented by e.g. a thermoplastic polyolefin.

However, a thermoplastic elastomer having poor adhesive properties and polarity on the surface, is not easily bonded to glass. Accordingly, a conventional adhesive is not suitable for bonding glass and a thermoplastic elastomer in some cases. As scales for measuring the performance of an adhesive, initial adhesive strength and durable adhesive strength such as warm water resistance, heat resistance and chemical resistance may be mentioned. Particularly, with respect to an adhesive to be used for a member for an automobile, there are many durability tests corresponding to the severe use environment. However, in the case of bonding glass and a thermoplastic elastomer with a conventional adhesive, no sufficient adhesive strength can be obtained at an initial stage before the durable adhesive strength is measured.

DISCLOSURE OF THE INVENTION

Japanese Patent No. 3,142,985 (hereinafter referred to as publication NO. '985) discloses use of a composition comprising an organosilane aid and a chlorinated polyolefin having a molecular weight of from 1,000 to 300,000 as basic components to bond glass and a thermoplastic resin, particularly, it discloses use of an isotactic chlorinated polypropylene grafted by maleic anhydride as a chlorinated polyolefin and epoxysilane as an organosilane aid can improve adhesive properties between glass and a thermoplastic resin.

However, when bonding between a glass article and a thermoplastic elastomer was attempted in accordance with the disclosure in e.g. publication No. '985, the initial hot strength was poor due to spontaneous peeling by heat, and the composition was insufficient as an adhesive for a glass article and a thermoplastic elastomer.

Accordingly, it is an object of the present invention to provide an adhesive composition which is excellent in initial adhesive strength and at the same time excellent in durability, and which exhibits sufficient adhesive strength when used for bonding a window glass and a thermoplastic elastomer molding for an automobile, and a glass plate with a thermoplastic elastomer molding employing such an adhesive composition.

The present invention provides an adhesive composition to be used for bonding a thermoplastic elastomer and a glass article, which comprises a chlorinated polyolefin, an epoxy group-containing compound and a silane coupling agent (hereinafter referred to as "the composition of the present invention").

Further, the present invention provides a glass plate with a thermoplastic elastomer molding, which comprises a glass plate and a thermoplastic elastomer molding integrated around the periphery of the glass plate by means of an adhesive layer made of the composition of the present invention.

BEST MODE FOR CARRYING OUT THE INVENTION

Figure 1:
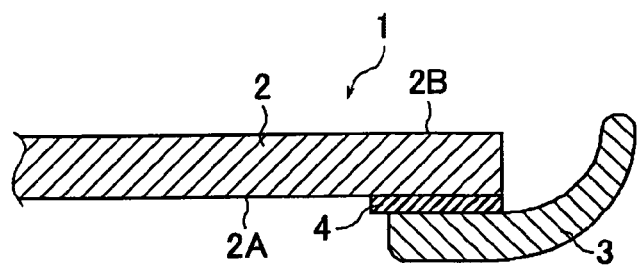
FIG. 1 is a sectional view schematically illustrating one example of the glass plate with a thermoplastic elastomer molding of the present invention.

The chlorinated polyolefin as an essential component in the composition of the present invention is one obtained by chlorinating a polyolefin such as polypropylene, a propylene/ethylene copolymer, a propylene/butene copolymer or a propylene/ethylene/butene copolymer. The polyolefin is preferably one containing at least 50 mol % of units based on propylene, particularly preferably one having crystallinity. By use of a chlorinated polyolefin obtained by chlorinating a polyolefin containing at least 50 mol % of units based on propylene, the composition of the present invention is excellent in cohesive force and is also excellent in adhesive strength with a thermoplastic elastomer.

Chlorination may be carried out by such a method that in a pressure reactor lined with glass, a polyolefin is (1) heated and dissolved in an aqueous mixed solvent containing a chlorine type solvent such as carbon tetrachloride or chloroform and ion-exchanged water, or (2) heated and dissolved in a chlorine type solvent such as carbon tetrachloride or chloroform, and a radical generator is added thereto, and then a chlorine gas is blown to achieve a predetermined chlorine content, and after completion of the reaction, the solvent is removed.

The chlorinated polyolefin of the present invention preferably has the following physical properties.

The chlorine content in the chlorinated polyolefin is preferably from 15 to 35 mass %. When the chlorine content is at least 15 mass %, sufficient solubility in an organic solvent will be obtained, and the solution will be stabilized. When the chlorine content is at most 35 mass %, sufficient cohesive force of the chlorinated polyolefin will be obtained, and sufficient adhesive strength will be obtained.

In the present invention, it is preferred to use, as the chlorinated polyolefin, one comprising two or more chlorinated polyolefin components having different chlorine contents, since a cohesive effect at a high temperature will be obtained, and further, adhesive characteristics more excellent in shear adhesive strength will be obtained. For example, it is more preferred to use a chlorinated polyolefin comprising one or more chlorinated polyolefin components having a chlorine content of at least 25 mass % and at most 35 mass % (hereinafter referred to as "high chlorine content component") and one or more chlorinated polyolefin components having a chlorine content of at least 15 mass % and less than 25 mass % (hereinafter referred to as "low chlorine content component"), in view of high cohesive force characteristic of a low chlorine content component and excellent compatibility with an epoxy group-containing compound and a silane coupling agent characteristic of a high chlorine content component. Further, it is more preferred to use one or more chlorinated polyolefins (low chlorine content component) having a chlorine content of from 18 to 22 mass % and a weight-average molecular weight of from 180,000 to 210,000 and one or more chlorinated polyolefins (high chlorine content component) having a chlorine content of from 25 to 29 mass % and a weight-average molecular weight of from 100,000 to 170,000, with a view to satisfying both cohesive force and compatibility at higher levels. In such a case, preferred is a chlorinated polyolefin having a proportion of the low chlorine content component to the high chlorine content component (low chlorine content component/high chlorine content component) of from 5/1 to 25/1 by mass ratio, with which an adhesive having both particularly excellent cohesive force at a high temperature and particularly excellent solubility in an organic solvent and compatibility with an epoxy group-containing compound and a silane coupling agent, can be obtained.

The method of measuring the chlorine content in the chlorinated polyolefin may, for example, be potentiometric titration.

The weight-average molecular weight of the chlorinated polyolefin is preferably from 40,000 to 250,000. When the weight-average molecular weight is at least 40,000, sufficient cohesive force will be obtained, and sufficient adhesive strength will be obtained. When the weight-average molecular weight is at most 250,000, favorable compatibility with an epoxy group-containing compound and a silane coupling agent will be obtained, excellent solubility in an organic solvent will be obtained, and excellent fluidity at room temperature to obtain favorable operation properties when the adhesive is applied will also be obtained.

The method of measuring the weight-average molecular weight is not particularly limited, and it may, for example, be a measurement method (as calculated as standard polystyrene) by means of gel permeation chromatography (GPC).

The degree of crystallinity of the chlorinated polyolefin is preferably from 10 to 50%. When the degree of crystallinity is at least 10%, sufficient cohesive force will be obtained, and sufficient adhesive strength will be obtained. When the degree of crystallinity is at most 50%, excellent solubility in an organic solvent will be obtained, excellent fluidity at room temperature to obtain favorable operation properties at the time of coating will be obtained, and further, storage at a low temperature will be possible. Further, when the degree of crystallinity is at most 50%, it tends to be easy to uniformly mix the chlorinated polyolefin with an epoxy group-containing compound and a silane coupling agent.

The method of measuring the degree of crystallinity may, for example, be a transmission method by means of X-ray diffraction.

The epoxy group-containing compound in the present invention is a compound having one or more epoxy groups in its molecule, and it may, for example, be an epoxy resin such as a bisphenol A type epoxy resin, a bisphenol F type epoxy resin, a novolac type epoxy resin, a phenol novolac type epoxy resin or an orthocresole type epoxy resin, a multifunctional epoxide such as trimethylolpropane triglycidyl ether, or a monofunctional epoxide such as para-tertiary butyl phenyl glycidyl ether.

Further, preferred is one having an epoxy equivalent of from 100 to 800 g/eq, and more preferred is one having an epoxy equivalent of from 130 to 250 g/eq, which has favorable reactivity with an active hydrogen compound and favorable fluidity as a single substance.

As specific examples of the epoxy group-containing compound, commercially available products such as DENACOL EX-146, tradename (manufactured by Nagase ChemteX Corporation, epoxy equivalent: 225 g/eq), Epikote 828, tradename (manufactured by Japan Epoxy Resin Co., Ltd., epoxy equivalent: 184 to 194 g/eq) and EPOLIGHT 100MF, tradename (manufactured by KYOEISHA CHEMICAL CO., LTD., epoxy equivalent: 135 to 145 g/eq) may be mentioned.

The composition of the present invention is excellent in heat resistance by employing the epoxy group-containing compound as an essential component. The reason is considered to be because when the composition of the present invention is heated, hydrogen chloride leaving from the chlorinated polyolefin in the composition is scavenged by the epoxy group-containing compound, whereby the increase in hydrogen chloride can be inhibited. By the epoxy group-containing compound, heat resistance particularly in the case of adhesion of an olefin type thermoplastic elastomer can be improved.

In the composition of the present invention, as the proportion of the epoxy group-containing compound to the chlorinated polyolefin, the proportion of the epoxy group-containing compound is preferably from 0.1 to 28 parts by mass per 100 parts by mass of the chlorinated polyolefin. When the epoxy group-containing compound is at least 0.1 part by mass per 100 parts by mass of the chlorinated polyolefin, the adhesive composition will be excellent in durability under heating. Further, the epoxy group-containing compound in an excess amount will decrease the adhesive properties, and thus when it is at most 28 parts by mass, adhesion with a thermoplastic elastomer will be stabilized. The above proportion is more preferably from 0.1 to 25 parts by mass with a view to further stabilizing the adhesion with a thermoplastic elastomer.

Further, when the above high chlorine content component having a weight-average molecular weight of from 40,000 to 170,000 is used as the chlorinated polyolefin, as the proportion of the above epoxy group-containing compound to the chlorinated polyolefin, the proportion of the epoxy group-containing compound is preferably from 0.1 to 30 parts by mass per 100 parts by mass of the chlorinated polyolefin. The adhesive strength will not decrease when the proportion is within the above range.

The silane coupling agent as an essential component in the composition of the present invention may be one having a functional group such as a glycidyl group, a vinyl group, a thiol group or an amino group at the terminal. Particularly preferred is an amino group-containing silane coupling agent having an amino group at the terminal, which has sufficient compatibility with the chlorinated polyolefin and which can function also as a curing catalyst for the epoxy group-containing compound blended, and which thereby makes the initial adhesive strength and adhesive strength after a warm water resistance test and after a heat resistance test favorable.

The silane coupling agent is contained in a proportion of preferably from 0.5 to 10 parts by mass per 100 parts by mass of the total amount of the chlorinated polyolefin and the epoxy group-containing compound. When the proportion is at least 0.5 part by mass, excellent adhesive properties with glass will be obtained. If the amount of the silane coupling agent is too large, the silane coupling agent undergoes bonding, and the adhesive properties with a thermoplastic elastomer tends to decrease.

With the composition of the present invention, in addition to the chlorinated polyolefin, the epoxy group-containing compound and the silane coupling agent, another component may be blended within a range not to impair the object of the present invention. Such another component may, for example, be an antioxidant, an ultraviolet absorber, a light stabilizer, an anti-blocking agent or carbon black, or various additives to be added to an adhesive as the case requires.

It is preferred to incorporate into the composition of the present invention an ultraviolet absorber and a light stabilizer in combination among the above additives, in view of excellent ultraviolet light resistance characteristics, warm water resistance characteristics, hot water resistance characteristics, etc.

The ultraviolet absorber may, for example, be a commonly used benzotriazole type ultraviolet absorber or phenylhydroxytriazine type ultraviolet absorber, and specifically, it may, for example, be TINUVIN 384 and 400 manufactured by Ciba Specialty Chemicals. The ultraviolet absorber may be used alone or as a mixture of two or more types thereof. It is preferred to use an ultraviolet absorber which absorbs a long wavelength component among ultraviolet rays and an ultraviolet absorber which absorbs a short wavelength component in combination, with a view to effectively absorbing ultraviolet rays regardless of the wavelength.

The light stabilizer may, for example, be a commonly used hindered amine type light stabilizer, and specifically, it may, for example, be TINUVIN 292 manufactured by Ciba Specialty Chemicals. The light stabilizer may be used alone or as a mixture of two or more types thereof.

It is preferred to add the ultraviolet absorber and the light stabilizer in a total amount of from 0.5 to 10 parts by mass per 100 parts by mass of the total amount of the chlorinated polyolefin and the epoxy group-containing compound in view of excellent improving effects. It is particularly preferred to add them in a proportion of from 4 to 9 parts by mass in view of more excellent improving effects.

The composition of the present invention is prepared preferably by dissolving the chlorinated polyolefin, the epoxy group-containing compound and the silane coupling agent, and other components added as the case requires, in an organic solvent. The organic solvent used may, for example, be an aromatic hydrocarbon such as toluene or xylene, an alicyclic hydrocarbon such as cyclohexane or methylcyclohexane, an ester such as isopropyl acetate or butyl acetate or a ketone such as methyl ethyl ketone or methyl isobutyl ketone, and they may be used alone or as a mixture of two or more types thereof.

At that time, the concentration of the total of the chlorinated polyolefin and the epoxy group-containing compound is preferably from 5 to 30 mass %, more preferably from 8 to 25 mass %. When the concentration is at least 5 mass %, no double coating will be necessary, whereby the coating process can be simplified. When the concentration is at most 30 mass %, these compounds will be dissolved in an organic solvent and an adhesive solution can be prepared.

The composition of the present invention is suitable as an adhesive for bonding a thermoplastic elastomer and glass, and the present invention provides a glass plate with a thermoplastic elastomer molding employing this adhesive composition. Now, the glass plate with a thermoplastic elastomer molding of the present invention will be explained in detail with reference to FIGS. 1 to 3.

FIG. 1 is a sectional view schematically illustrating the substantial part of one example of the glass plate with a thermoplastic elastomer molding of the present invention. In FIG. 1, numerical reference 1 designates a glass plate with a thermoplastic elastomer molding (hereinafter sometimes referred to simply as "a glass plate with a molding"), numerical reference 2 designates a glass plate, numerical reference 2A designates a rear face, numerical reference 2B designates a front face, numerical reference 3 designates a thermoplastic elastomer molding and numerical reference 4 designates an adhesive layer. The glass plate 1 with a molding comprises a glass plate 2 having a front face 2B and a rear face 2A and a thermoplastic elastomer molding 3 integrated by means of an adhesive layer 4.

The thermoplastic elastomer molding 3 is molded preferably by a resin molding method such as injection molding or extrusion molding. As a method by injection molding, a method may, for example, be employed wherein the glass plate 2 is disposed in a mold having an impression which substantially agrees with the shape of the thermoplastic elastomer molding 3 and clamped, to form a cavity by the impression and the periphery of the glass plate 2, and a resin material is injected into the cavity of the mold to carry out integral injection molding, so as to integrally mold the thermoplastic elastomer molding 3 around the periphery of the glass plate 2. In this case, before the glass plate 2 is disposed in the mold, the periphery of the glass plate 2 with which the thermoplastic elastomer molding 3 is integrated is preliminarily coated with the composition of the present invention to form the adhesive layer 4.

Here, the thermoplastic elastomer to form a thermoplastic elastomer molding is not particularly limited, and it may, for example, be an olefin type thermoplastic elastomer, a styrene type thermoplastic elastomer, a urethane type thermoplastic elastomer, a polyamide type thermoplastic elastomer, a 1,2-polybutadiene type thermoplastic elastomer or a vinyl chloride type thermoplastic elastomer. Among them, an olefin type thermoplastic elastomer is preferred in view of excellent adhesion properties with the composition of the present invention. The olefin type thermoplastic elastomer may, for example, be commercially available products such as Santoprene, MILASTOMER, Sumitomo TPE, Thermorun, Oleflex, Miraprene, PER, IDEMITSU TPO and Sarlink.

With the above thermoplastic elastomer, various commonly used additives may be blended.

Further, a method may also be employed wherein the thermoplastic elastomer molding 3 is once formed into a loop shape so that it can be bonded to the entire circumference of the glass plate or into a horseshoe shape so that it can be bonded to a part of the periphery of the glass plate, e.g. three sides, not the entire circumference, by injection molding, and the molded thermoplastic elastomer molding 3 is pressed on the glass plate 2 so that the thermoplastic elastomer molding 3 is integrated with the glass plate 2. In this case, before the thermoplastic elastomer molding 3 is pressed on the periphery of the glass plate 2, the periphery of the glass plate 2 is coated with the composition of the present invention, or the face of the thermoplastic elastomer molding 3 which faces the glass plate 2 may be coated with the composition of the present invention.

Figure 2:
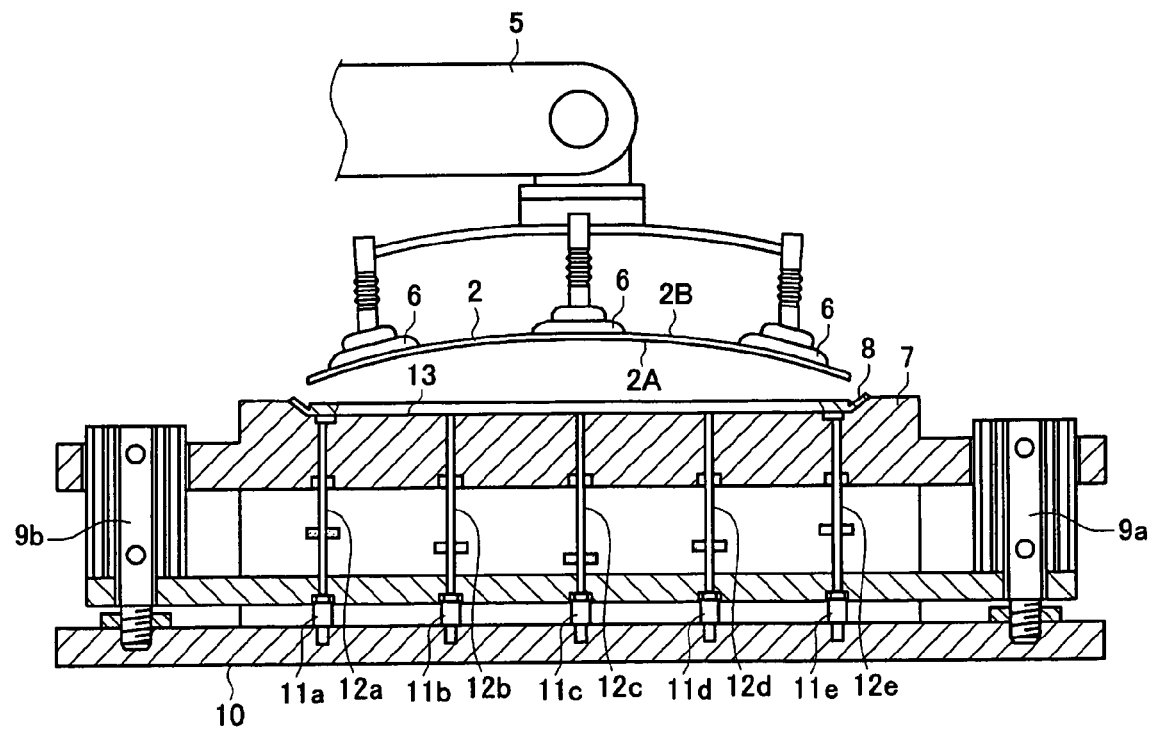
FIG. 2 is a drawing explaining an example for producing a glass plate with a thermoplastic elastomer molding by injection molding.

FIG. 2 illustrates another method for producing a glass plate with a thermoplastic elastomer molding by employing injection molding. In FIG. 2, numerical reference 2 designates a glass plate, numerical reference 2A designates a rear face, numerical reference 2B designates a front face, numerical reference 5 designates a holder, numerical reference 6 designates a sucker, numerical reference 7 designates a first mold, numerical reference 8 designates a thermoplastic elastomer molding, numerical references 9a and 9b designate a cylinder, numerical reference 10 designates an up-and-down member, numerical references 11a, 11b, 11c, 11d and 11e designate a stopper, numerical references 12a, 12b, 12c, 12d and 12e designate an ejection pin, and numerical reference 13 designates a cavity wall.

In a method as shown in FIG. 2, the composition of the present invention is preliminarily applied along the periphery of the rear face 2A of the glass plate 2 to form an adhesive layer, and further, after the glass plate 2 is preheated, the front face 2B of the glass plate 2 is attached to the suckers 6 of the holder 5 to hold the glass plate 2. On the other hand, a molten thermoplastic elastomer is injected into a cavity formed by the lower first mold 7 and an upper second mold (not shown) to mold the thermoplastic elastomer molding 8, followed by mold opening to remove the upper second mold so that the adhesion face of the thermoplastic elastomer molding 8 is exposed to the outside, and further, the holder 5 is made to operate and the glass plate 2 is disposed so that the rear face 2A faces the thermoplastic elastomer molding 8.

Then, the cylinders 9a and 9b are synchronously driven to elevate the up-and-down member 10. The up-and-down member 10 elevates the ejection pins 12a, 12b, 12c, 12d and 12e by means of the stoppers 11a, 11b, 11c, 11d and 11e, respectively, so that the tips of the ejection pins 12a, 12b, 12c, 12d and 12e are ejected from the cavity wall 13 of the first mold 7, whereby the thermoplastic elastomer molding 8 is projected toward the rear face 2A of the glass plate 2 and pressed simultaneously over the whole edge of the glass plate 2 and provisionally bonded.

Then, by means of the holder 5, the provisionally bonded glass plate 2 and thermoplastic elastomer molding 8 are transferred to a table for main bonding, the thermoplastic elastomer molding 8 is mounted on a pressing face of the table for main bonding and pressed under a certain pressure for a certain time by the holder 5 to obtain a glass plate with a molding. Such a method may, for example, be a method as disclosed in JP-A-2000-79626.

The method of molding a molding by extrusion molding, may, for example, be a method of extruding a resin material from an extrusion molding die having an aperture which substantially agrees with the cross sectional shape of the molding, for molding. At that time, (a) the thermoplastic elastomer molding immediately after extruded from the extrusion molding die is pressed on the periphery of the glass plate and integrated, or (b) the thermoplastic elastomer molding is extruded from the extrusion molding die directly on the periphery of the glass plate and integrated. In either method, a method of preliminarily coating the periphery of the glass plate with the composition of the present invention to form an adhesive layer may be employed.

Figure 3:
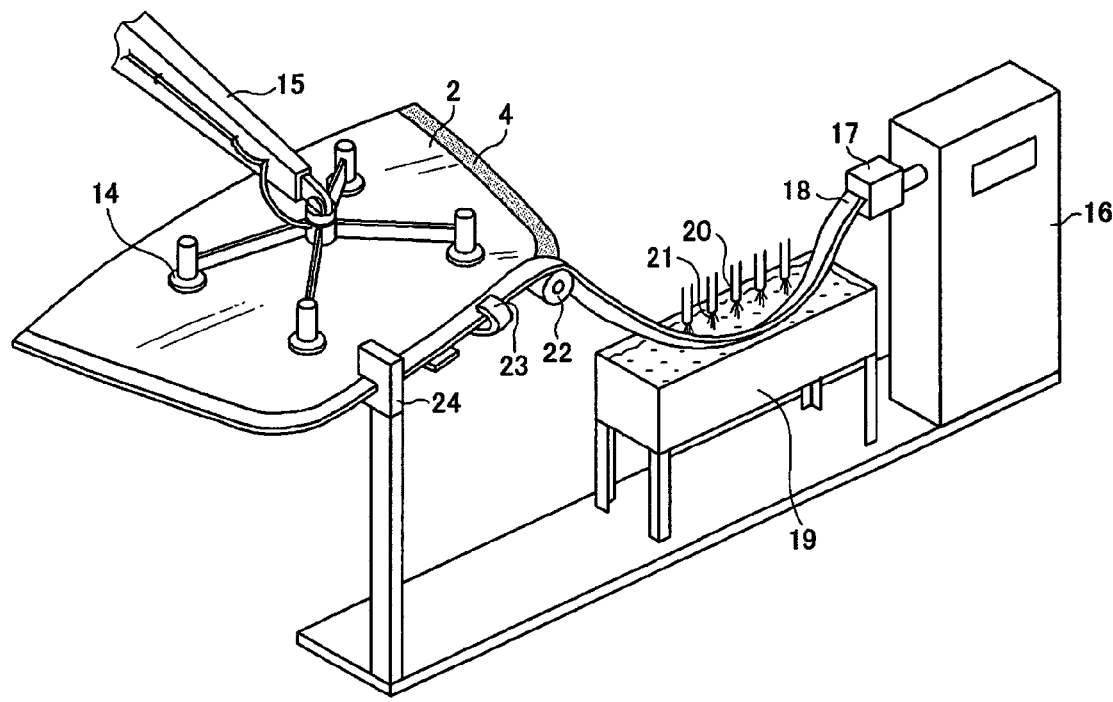
FIG. 3 is a drawing explaining an example for producing a glass plate with a thermoplastic elastomer molding by extrusion molding.

As a specific example of the method (a) wherein the thermoplastic elastomer molding immediately after extruded from the extrusion molding die is pressed on the periphery of the glass plate and integrated, a method schematically shown in FIG. 3 may be mentioned. In FIG. 3, numerical reference 2 designates a glass plate, numerical reference 4 designates an adhesive layer, numerical reference 14 designates a suction holding plate, numerical reference 15 designates a robot arm, numerical reference 16 designates an extruder, numerical reference 17 designates an extrusion molding die, numerical reference 18 designates a thermoplastic elastomer molding, numerical reference 19 designates a cooling water tank, numerical reference 20 designates a cooling spray, numerical reference 21 designates a cooling water, numerical reference 22 designates a holding roller, numerical reference 23 designates a heating apparatus and numerical reference 24 designates a pressure bonding member. In the method as shown in FIG. 3, the composition of the present invention is preliminarily coated on the periphery of the glass plate 2 and dried to form the adhesive layer 4. The glass plate 2 on which the adhesive layer 4 is formed is held by a robot (equipped with the suction holding plate 14 and the robot arm 15) and is capable of making a predetermined movement. At the tip of the extruder 16, the extrusion molding die 17 having an aperture which substantially agrees with the cross sectional shape of the thermoplastic elastomer molding 18 is provided.

The thermoplastic elastomer molding 18 extruded from the extrusion molding die 17 is cooled with a cooling water (numerical reference 19 designates a cooling water tank, 20 a cooling spray and 21 a cooling water). The cooled thermoplastic elastomer molding 18 is transferred, by means of the holding roller 22, to the heating apparatus 23 which heats a face which faces the glass plate 2, and inserted into the pressure bonding member 24. The pressure bonding member 24 has a cavity into which the thermoplastic elastomer molding 18 and the periphery of the glass plate 2 are inserted, and the periphery of the glass plate 2 and the thermoplastic elastomer molding 18 pass through the cavity so that the thermoplastic elastomer molding 18 is pressed and pressure bonded on the glass plate 2. The glass plate 2 is transported relatively to the pressure bonding member 24 by the driving of the robot so that the pressure bonding member 24 is along the periphery of the glass plate 2. In such a manner, a glass plate with a thermoplastic elastomer molding comprising the glass plate 2 and the thermoplastic elastomer molding 18 integrated around the periphery of the glass plate 2 can be produced. Such a production method is described in further detail in JP-A-2002-240122 (Japanese Patent Application 2001-045029).

As the glass plate in the glass plate with a thermoplastic elastomer molding of the present invention, various glass plates such as an inorganic single glass plate, a laminated glass comprising a plurality of glass plates laminated by means of an interlayer, a tempered glass having a tempering treatment applied thereto, and a glass plate having a surface treatment such as heat ray shielding coating applied thereto, may be used. Further, a transparent resin plate called organic glass may also be used.

The shape of the thermoplastic elastomer molding may optionally be determined depending upon e.g. the performance required and the design specification. For example, a loop shape or a horseshoe shape may be mentioned, and the molding may have the same cross sectional shape over the whole periphery of the glass plate or may have different cross sectional shapes depending upon the positions. Further, the molding may be integrated over the whole periphery of the glass plate or may be integrated on the specific side or portion of the glass plate.

On the glass plate with a thermoplastic elastomer molding of the present invention, a burned substance of a dark color ceramic paste, which is not shown in Fig, may be provided, in a region in which the adhesive layer 4 is to be formed on the periphery of the glass plate 2 in FIG. 1 for example. By the burned substance of a dark color ceramic paste, the adhesive layer 4 is shielded from the outside of the car, and transmission of ultraviolet light into the car can be prevented. The glass plate with a thermoplastic elastomer molding is fixed to the body (not shown) usually by a urethane type adhesive, and accordingly the burned substance of a dark color ceramic paste can prevent deterioration of the urethane type adhesive due to ultraviolet light. Further, with the composition of the present invention containing an ultraviolet absorber and a light stabilizer in combination so that ultraviolet light resistance is sufficiently added, the adhesive layer 4 having e.g. a pigment or a dye added thereto may function as a shielding layer which prevents irradiation of an adhesive for bonding to the body with ultraviolet light.

It is beneficial to use the glass plate with a thermoplastic elastomer molding of the present invention as a window of an automobile. The reason is that an automobile is exposed to high temperature particularly during parking in summer, and thus the effect of an adhesive excellent in heat resistance and durability obtained from the composition of the present invention is beneficial.

EXAMPLES

Now, the present invention will be explained in detail with reference to Examples and Comparative Examples, however, the present invention is by no means restricted to such specific Examples.

Example I (Production of Chlorinated Polypropylene)

Production Example 1

10 kg of an isotactic polypropylene (MI: melt index 15) and 167 kg of chloroform were put in a reactor lined with pressure resistant glass, heated and dissolved, and then 0.1 kg of dicumyl peroxide was added, and 7.4 kg of a chlorine gas was blown and reacted. Then, chloroform was removed, and solidified chlorinated isotactic polypropylene (hereinafter referred to as "CPP-1") was obtained. This CPP-1 had a chlorine content of 25.9 mass %, a weight-average molecular weight by GPC of from 140,000 to 150,000 and a degree of crystallinity of 12%.

Production Example 2

In the same manner as in Production Example 1 except that the amount of the chlorine gas blown was 7.0 kg, chlorinated isotactic polypropylene (hereinafter referred to as "CPP-2") was produced. The CPP-2 had a chlorine content of 22 mass %, a weight-average molecular weight by GPC of from 190,000 to 200,000 and a degree of crystallinity of 42%.

Production Example 3

In the same manner as in Production Example 1 except that the amount of the chlorine gas blown was 6.2 kg, chlorinated isotactic polypropylene (hereinafter referred to as "CPP-3") was produced. The CPP-3 had a chlorine content of 20 mass %, a weight-average molecular weight by GPC of from 190,000 to 200,000 and a degree of crystallinity of 44%.

Production Example 4

10 kg of maleic anhydride-modified polypropylene and 94 kg chloroform were put in a reactor lined with pressure resistant glass, heated and dissolved, and then 5.5 kg of a chlorine gas was blown, and after removal of chloroform, solidification was carried out to produce maleic anhydride-modified chlorinated isotactic polypropylene (hereinafter referred to as "MCPP"). This MCPP had a chlorine content of 20 mass %, a weight-average molecular weight by GPC of from 80,000 to 90,000 and a degree of crystallinity of 17%.

(Measurement of Chlorine Content)

The chlorine content of the obtained chlorinated polyolefin was measured by potentiometric titration.

(Measurement of Molecular Weight)

The weight-average molecular weight of each obtained chlorinated isotactic polypropylene was measured by means of gel permeation chromatography (GPC). Shodex GPC SYSTEM-21H (manufactured by SHOWA DENKO K.K.) was used as a GPC apparatus, tetrahydrofuran was used as a solvent, measurement was carried out at a measurement temperature of 40° C., and the weight-average molecular weight was obtained as calculated as standard polystyrene.

(Measurement of Degree of Crystallinity)

Each obtained chlorinated isotactic polypropylene after dried was formed into a film with a thickness of 1 mm, and the degree of crystallinity was measured by means of a transmission method by using an X-ray diffraction apparatus (RINT2550, manufactured by Rigaku Corporation).

(Production of Adhesive)

Examples 1 to 13

CPP-1, CPP-2, CPP-1 and CPP-3, or MCPP, as a chlorinated polyolefin (CPO), and trimethylolpropane triglycidyl ether (EPOLIGHT 100MF, manufactured by KYOEISHA CHEMICAL CO., LTD., epoxy equivalent: 135 to 145 g/eq) or bisphenol A type epoxy resin (epoxy equivalent: 184 to 194 g/eq) as an epoxy group-containing compound (EPO), in a composition and a mass ratio as shown in Table 1, were dissolved in 400 parts by mass of xylene, to prepare a xylene solution having a solid content concentration as shown in Table 2. To 100 parts by mass of this solution, a mixed silane coupling agent of γ-aminopropyltrimethoxysilane and N-2-(aminoethyl)-3-aminopropylmethoxysilane (mass ratio 1:2) or epoxysilane (3-glycidoxypropyltrimethoxysilane), as a silane coupling agent (SC), in a mass ratio ((CPO+EPO)/SC) as shown in Table 1, was added, followed by thorough mixing to prepare an adhesive.

(Production 1 of Glass Plate with a Molding)

Figure 4:
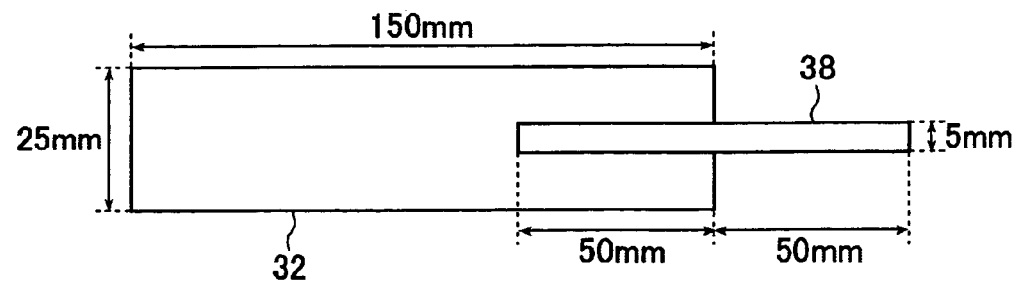
FIG. 4 is a top view explaining the shape and dimension of a test specimen used for an evaluation test (shear strength test).
Figure 5:
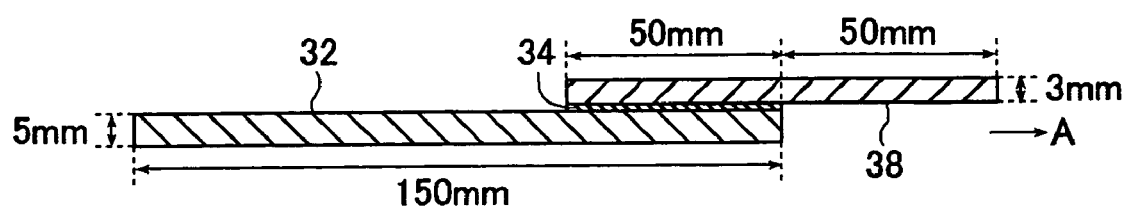
FIG. 5 is a sectional view schematically explaining the shape and dimension of a test specimen used for an evaluation test (shear strength test).

On a glass plate (width 25×length 150×thickness 5: unit mm), each of the adhesives obtained in Examples 1 to 13 was coated on a portion with a length of 50 mm from the edge in the length direction and with a length of about 20 mm at a center portion in the width direction so that the amount of the adhesive would be 15 g/m² as calculated as the resin (the thickness of the adhesive layer after drying: about 10 to about 20 μm), and the adhesive was dried by air blast to prepare a glass plate 32 having an adhesive layer 34 formed thereon as shown in FIGS. 4 and 5.

By a method shown in FIG. 3, an olefin type thermoplastic elastomer material (Santoprene 121-58W175, manufactured by Advanced Elastomer Systems) was extruded from an extrusion molding die having an aperture which substantially agrees with the cross sectional shape of a thermoplastic elastomer molding 38 as shown in FIGS. 4 and 5, chilled water was sprayed on the thermoplastic elastomer molding 38 having a predetermined cross section immediately after the extrusion, and then heated air was blown on the face of the thermoplastic elastomer molding 38 which faced a glass plate 32. The thermoplastic elastomer molding 38 immediately after heating was inserted into the cavity of a pressure bonding member, and the glass plate 32 held by a robot was relatively transferred so that the pressure bonding member was along the adhesion portion of the molding 38 (the glass plate was transferred in the length direction), whereby a glass plate with a thermoplastic elastomer molding was obtained.

Here, the glass temperature at the time of pressure bonding was the temperature as shown in Table 2. The width (width direction) of the adhesive portion of the glass plate 32 and the thermoplastic elastomer molding 38 was 5 mm, and the thickness of the thermoplastic elastomer molding was 3 mm. The thermoplastic elastomer molding 38 was cut so that the adhesive portion on the glass plate face was 50 mm from the edge in the length direction and 5 mm in the width direction, and it protruded from the edge in the length direction by 50 mm.

The glass plate with a thermoplastic elastomer molding thus obtained is, specifically, as shown in FIGS. 4 and 5. FIG. 4 is a top view explaining the shape and dimension of a test specimen used for an evaluation test (shear strength test), and FIG. 5 is a sectional view schematically explaining the shape and dimension of a test specimen used for an evaluation test (shear strength test). In FIG. 5, the adhesive layer 34 is described relatively thickly. In FIGS. 4 and 5, numerical reference 32 designates a glass plate, 34 an adhesive layer and 38 a thermoplastic elastomer molding.

(Production 2 of Glass Plate with a Molding)

In the same manner as in Production 1 of glass plate with a molding, a thermoplastic elastomer molding 38 was bonded to the whole region in the length direction so that the adhesion portion on the glass plate face was 70 mm from the edge in the length direction and 5 mm in the width direction, to obtain a glass plate with a thermoplastic elastomer molding.

Figure 6:
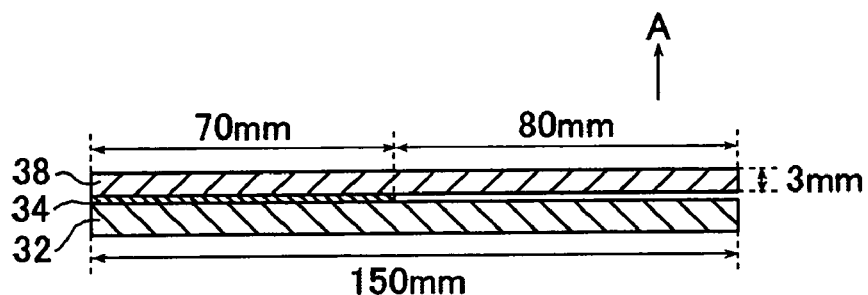
FIG. 6 is a sectional view schematically explaining the shape and dimension of a test specimen used for an evaluation test (peel strength test).

The glass plate with a thermoplastic elastomer molding thus obtained is, specifically, as shown in FIG. 6. FIG. 6 is a sectional view schematically explaining the shape and dimension of a test specimen used for an evaluation test (peel strength test). In FIG. 6, the adhesive layer 34 is described relatively thickly. In FIG. 6, numerical reference 32 designates a glass plate, 34 an adhesive layer and 38 a thermoplastic elastomer molding.

(Evaluation)

Each obtained glass plate with a thermoplastic elastomer molding (test specimen) was evaluated by the following methods. The results are shown in Table 2.

(Measurement of Initial Adhesive Strength (Initial Peel Strength, 80° C. Initial Hot (Peel) Strength and 90° C. Initial Hot Shear Strength))

1) Initial Peel Strength and 80° C. Initial Hot (Peel) Strength

The test specimen obtained in Production 2 of glass plate with a molding was left to stand at room temperature for 24 hours, and subjected to a 90 degree peel test in accordance with Floating-roller test as defined in JIS K6854 at a rate of travel of crosshead of 300 mm/min at room temperature and at 80° C., to measure the initial peel strength (N/cm) and the 80° C. initial hot (peel) strength (N/cm).

2) 90° C. Initial Hot Shear Strength

The test specimen obtained in Production 1 of glass plate with a molding was left to stand at room temperature for 24 hours, and subjected to a shear peel strength test in accordance with determination of tensile lap-shear strength as defined in JIS K6850 at a rate of travel of crosshead of 10 mm/min at 90° C., to measure the 90° C. initial hot shear strength (KPa).

Here, in each test, "in accordance with" means that the shape of the test specimen and the temperature conditions are different. The test specimen for measuring the initial peel strength and the 80° C. initial hot (peel) strength in the present Example has an adhesion portion of 70×5 (mm) (see FIG. 6), and the test specimen for measuring the 90° C. initial hot shear strength in the present Example has an adhesion portion of 50×5 (mm) (see FIGS. 4 and 5). In the initial peel strength test and the 80° C. initial hot (peel) strength test, the portion which was not bonded to the glass plate was bent 90 degree (the direction of an arrow A in FIG. 6, corresponding to JIS K6854), and in the 90° C. initial hot shear strength test, measurement was carried out with pulling in the shearing direction (the direction of an arrow A in FIG. 5, corresponding to JIS K6850).

Here, in Table 2, "-" in the column "90° C. initial hot shear strength" means not measured.

(Durability (Heat Resistance Test))

The test specimen obtained in Production 2 of glass plate with a molding was left to stand at room temperature for 24 hours and heated at 90° C. for 240 hours, and then subjected to a 90 degree peel test in accordance with JIS K6854 at room temperature to measure the hot strength (N/cm) (heat resistance test).

TABLE 1

| | Chlorinated polyolefin (CPO) | | Epoxy group-containing resin (EPO) | | | Silane coupling agent (SC) | |
|---|---|---|---|---|---|---|---|
| Ex. | Type | CPP-1/ (CPP-2, CPP-3, MCPP) (Mass ratio) | Type | Epoxy equivalent (g/eq) | EPO/CPO (Mass ratio) | Type | CPO + EPO/SC (Mass ratio) |
| 1 | CPP-1 | — | 100/0 | Multifunctional epoxide *1 | 135 to 145 | 3/100 | Aminosilane *3 | 100/1.0 |
| 2 | CPP-1 | — | 100/0 | Multifunctional epoxide | 135 to 145 | 15/100 | Aminosilane | 100/0.9 |
| 3 | CPP-1 | — | 100/0 | Multifunctional epoxide | 135 to 145 | 15/100 | Aminosilane | 100/2.6 |
| 4 | CPP-1 | — | 100/0 | Multifunctional epoxide | 135 to 145 | 25/100 | Aminosilane | 100/0.8 |
| 5 | CPP-1 | — | 100/0 | Bisphenol A type epoxy resin *2 | 184 to 194 | 6/100 | Aminosilane | 100/4.7 |

TABLE 1-continued

| Ex. | Chlorinated polyolefin (CPO) Type | CPP-1/ (CPP-2, CPP-3, MCPP) (Mass ratio) | Epoxy group-containing resin (EPO) Type | Epoxy equivalent (g/eq) | EPO/CPO (Mass ratio) | Silane coupling agent (SC) Type | CPO + EPO/SC (Mass ratio) |
|---|---|---|---|---|---|---|---|
| 6 | — | MCPP 0/100 | — | — | 0/100 | Epoxysilane | 100/1.0 |
| 7 | — | CPP-2 0/100 | Multifunctional epoxide | 135 to 145 | 5/100 | Aminosilane | 100/2.9 |
| 8 | — | CPP-2 0/100 | — | — | 0/100 | Aminosilane | 100/3.0 |
| 9 | CPP-1 | CPP-3 10.9/87.5 | Multifunctional epoxide | 135 to 145 | 1.7/100 | Aminosilane | 100/2.9 |
| 10 | CPP-1 | CPP-3 4.3/95 | Multifunctional epoxide | 135 to 145 | 0.7/100 | Aminosilane | 100/3.0 |
| 11 | CPP-1 | CPP-3 10.9/87.5 | Multifunctional epoxide | 135 to 145 | 25/100 | Aminosilane | 100/2.4 |
| 12 | CPP-1 | CPP-3 10.9/87.5 | Multifunctional epoxide | 135 to 145 | 15/100 | Aminosilane | 100/2.6 |
| 13 | CPP-1 | CPP-3 10.9/87.5 | Multifunctional epoxide | 135 to 145 | 5/100 | Aminosilane | 100/2.9 |

Note
*1 Multifunctional epoxide: trimethylolpropane triglycidyl ether (manufactured by KYOEISHA CHEMICAL CO., LTD., EPOLIGHT 100MF, epoxy equivalent: 135 to 145 g/eq)
*2 Bisphenol A type epoxy resin: epoxy equivalent: 184 to 194 g/eq
*3 Aminosilane: γ-aminopropyltrimethoxysilane + N-2-(aminoethyl)-3-aminopropyltrimethoxysilane

TABLE 2

| Ex. | Solid content concentration (mass %) | Glass temperature (° C.) | Initial peel strength (N/cm) | 80° C. initial hot strength (N/cm) | Heat resistance test (N/cm) | 90° C. initial hot shear strength (KPa) |
|---|---|---|---|---|---|---|
| 1 | 20 | 95 | 57 | 9 | 52 | — |
| 2 | 20 | 95 | 53 | 15 | 51 | — |
| 3 | 20 | 80 | 64 | 22 | 60 | 27 |
| 4 | 20 | 65 | 57 | 17 | 55 | — |
| 5 | 20 | 80 | 55 | 17 | 56 | — |
| 6 | 13 | 75 | 58 | Spontaneous peeling | 18 *4 | — |
| 7 | 10 | 80 | 55 | 12 | 62 | — |
| 8 | 10 | 80 | 25 | 5 | 56 | — |
| 9 | 10 | 80 | 52 | 17 | 55 | 59 |
| 10 | 10 | 80 | 53 | 10 | 56 | 62 |
| 11 | 10 | 80 | 46 | 9 | 55 | 48 |
| 12 | 10 | 80 | 40 | 11 | 55 | 47 |
| 13 | 10 | 80 | 54 | 13 | 55 | 63 |

Note
*4 Measurement with respect to a remaining portion which was not spontaneously peeled.

In Tables 1 and 2, Examples 1 to 5, 7 and 9 to 13 are Examples of the present invention, and Examples 6 and 8 are Comparative Examples of the present invention. Particularly, Examples 6 and 8 are examples in which an adhesive composition containing no epoxy group-containing compound were used, and Example 6 corresponds to an example in which the adhesive as disclosed in the above publication No. '985 was used.

From the evaluation results as shown in Table 2, it is found that in Examples 6 and 8 which are examples in which an adhesive composition containing no epoxy group-containing compound was used, the 80° C. initial hot strength is low, and particularly in Example 6, the thermoplastic elastomer underwent spontaneous peeling in the 80° C. initial hot strength test, and the composition is poor in heat resistance.

Further, in Examples 9 to 13 in which a chlorinated polyolefin comprising a high chlorine content component (CPP-1) having a chlorine content of 25.9% and a low chlorine content component (CPP-3) having a chlorine content of 20.0% was used, the 90° C. initial hot shear strength is high, and the composition is found to be excellent in shear adhesive properties as compared with Example 3 in which CPP-1 alone was used as a chlorinated polyolefin.

Example II

To the composition of the present invention having a composition as shown in Example 9 of the above Example I, TINUVIN 384 and TINUVIN 400 as ultraviolet absorbers, and TINUVIN 292 as a light stabilizer (each manufactured by Ciba Specialty Chemicals) were added in amounts of 3.5 parts by mass, 3.5 parts by mass and 1.5 parts by mass, respectively, per 100 parts by mass of the total amount of the chlorinated polyolefin (CPO) and the epoxy group-containing compound (EPO), to prepare an adhesive.

By using the adhesive and a glass plate on which no burned substance of a dark color ceramic paste was formed, a glass plate with a thermoplastic elastomer molding (test specimen) was obtained in the same manner as in the above Production 2 of glass plate with a molding. The obtained test specimen was evaluated by the following methods. The results are shown in Table 3.

(Evaluation)
(Initial Peel Strength)

The obtained test specimen was left to stand at room temperature for 24 hours, and then the initial peel strength (N/cm) was measured in the same manner as in the 90 degree peel test in the above Example I at room temperature.

(Ultraviolet Light Resistance Characteristics)

The obtained test specimen was subjected to nine cycles, each cycle consisting of the following 1) to 5) steps, and then the test specimen was left to stand at room temperature for 24 hours, and the peel strength after irradiation with ultraviolet light was measured in the same manner as in the 90 degree peel test in the above Example I at room temperature (ultraviolet light resistance characteristics, N/cm).

1) The test specimen was irradiated with ultraviolet light at 50° C. at a humidity of 95 RH % with an irradiation amount of 80 mW/cm$^2$ for 4 hours. Metal Weather (KU-R4CI-A) manufactured by DAIPLA WINTES CO., LTD. as an irradiation apparatus, metal halide lamp (MW-60W) manufactured by DAIPLA WINTES CO., LTD. as a lamp and KF-2 manufactured by DAIPLA WINTES CO., LTD. as a filter, were used.

2) The test specimen was left to stand for 4 hours without irradiation with ultraviolet light at 50° C. at a humidity of 95 RH %.

3) The test specimen was showered with water for 10 seconds.

4) The test specimen was left to stand for 4 hours without irradiation with ultraviolet light at 50° C. at a humidity of 95 RH %.

5) The test specimen was showered with water for 10 seconds.

(Durability (Heat Resistance Test))

Using the obtained test specimen, the hot strength (N/cm) was measured in the same manner as in (Durability (heat resistance test)) in the above Example I (heat resistance test).

(Moisture Resistance Test)

The obtained test specimen was left to stand at room temperature for 24 hours, and then left at 50° C. at a humidity of 95 RH % for 240 hours, and further left to stand at room temperature for 24 hours, and then the peel strength (N/cm) was measured in the same manner as in the 90 degree peel test of the above Example I (moisture resistance test).

(Warm Water Resistance Test)

The obtained test specimen was left to stand at room temperature for 24 hours, immersed in warm water of 40° C. for 240 hours, and further left to stand at room temperature for 24 hours, and the peel strength (N/cm) was measured in the same manner as in the 90 degree peel test of the above Example I (warm water resistance test).

(Hot Water Resistance Test)

The obtained test specimen was left to stand at room temperature for 24 hours, immersed in hot water of 80° C. for 96 hours, and further left to stand at room temperature for 24 hours, and the peel strength (N/cm) was measured in the same manner as in the 90 degree peel test of the above Example I (hot water resistance test).

TABLE 3

| | Ex. 2 |
|---|---|
| Initial peel strength (N/cm) | 44 |
| Ultraviolet light resistance characteristics (N/cm) | 43 |
| Heat resistance test (N/cm) | 50 |
| Moisture resistance test (N/cm) | 56 |
| Warm water resistance test (N/cm) | 52 |
| Hot water resistance test (N/cm) | 52 |

In general, it is known that when a glass plate having no burned substance of a dark color ceramic paste formed thereon is used, the adhesive layer is exposed to ultraviolet light and accordingly it is deteriorated, thus leading to weak adhesive strength. However, as evident from the evaluation results shown in Table 3, when ultraviolet light absorbers and a light stabilizer were used in combination with the composition of the present invention, the peel strength after irradiation with ultraviolet light (ultraviolet light resistance characteristics) improved. Further, the ultraviolet light resistance characteristics improved as compared with a single use of an ultraviolet absorber or a light stabilizer, and further, the peel strength after immersion in warm water (warm water resistance test) and the peel strength after immersion in hot water (hot water resistance test) significantly improved.

Industrial Applicability

The adhesive composition of the present invention is excellent in initial adhesive strength and is also excellent in durability, and exhibits sufficient adhesive strength for bonding a thermoplastic elastomer and glass. Thus, adhesive properties of a thermoplastic elastomer which has not been readily bonded to glass are improved, and particularly, strong adhesive force between a thermoplastic elastomer molding and a window glass of an automobile which is exposed to severe use environment can be obtained.

Further, the glass plate with a thermoplastic elastomer molding of the present invention has high adhesive strength and excellent durability, by bonding a thermoplastic elastomer molding to the periphery of a glass plate by using the adhesive composition of the present invention.

The entire disclosure of Japanese Patent Application No. 2002-255226 filed on Aug. 30, 2002 including specification, claims, drawings and summary is incorporated herein by reference in its entirety.

What is claimed is:

1. An adhesive composition comprising a chlorinated polyolefin, an epoxy group-containing compound and a silane coupling agent, wherein the chlorinated polyolefin comprises one or more chlorinated polyolefins (low chlorine content component) having a chlorine content of at least 15 mass % and less than 25 mass %, and one or more chlorinated polyolefins (high chlorine content component) having a chlorine content of at least 25 mass % and at most 35 mass %.

2. The adhesive composition according to claim 1, wherein the mass ratio of the low chlorine content component to the high chlorine content component (low chlorine content component/high chlorine content component) is from 5/1 to 25/1.

3. An adhesive composition comprising a chlorinated polyolefin, an epoxy group-containing compound and a silane coupling agent, wherein the chlorinated polyolefin comprises one or more chlorinated polyolefins (low chlorine content component) having a weight-average molecular weight of from 180,000 to 210,000 and a chlorine content of from 18 to 22 mass %, and one or more chlorinated polyolefins (high chlorine content component) having a weight-average molecular weight of from 100,000 to 170,000 and a chlorine content of from 25 to 29 mass %.

* * * * *